(12) United States Patent
Base (10) Patent No.: US 11,181,184 B2
(45) Date of Patent: Nov. 23, 2021

(54) DRIVE ASSEMBLY WITH PASSIVE PUMP LUBRICATION

(71) Applicant: Deere & Company, Moline, IL (US)

(72) Inventor: Douglas S. Base, Coffeyville, KS (US)

(73) Assignee: DEERE & COMPANY, Moline, IL (US)

( * ) Notice: Subject to any disclaimer, the term of this patent is extended or adjusted under 35 U.S.C. 154(b) by 705 days.

(21) Appl. No.: 16/149,376

(22) Filed: Oct. 2, 2018

(65) Prior Publication Data

US 2020/0103018 A1 Apr. 2, 2020

(51) Int. Cl.
| | |
|---|---|
| *F16H 57/04* | (2010.01) |
| *F16D 65/853* | (2006.01) |
| *B62D 55/125* | (2006.01) |
| *F16D 69/00* | (2006.01) |

(52) U.S. Cl.
CPC ....... *F16H 57/0424* (2013.01); *B62D 55/125* (2013.01); *F16D 65/853* (2013.01); *F16H 57/045* (2013.01); *F16H 57/0445* (2013.01); *F16H 57/0457* (2013.01); *F16H 57/0473* (2013.01); *F16H 57/0475* (2013.01); *F16D 2069/004* (2013.01)

(58) Field of Classification Search
CPC ............... F16D 65/853; F16H 57/0424; F16H 57/0445; F16H 57/0473; F16H 57/0475; F16H 57/045; F16H 57/0457
See application file for complete search history.

(56) References Cited

U.S. PATENT DOCUMENTS

| | | | | |
|---|---|---|---|---|
| 3,835,971 A | * | 9/1974 | Spanke | B30B 15/10 192/18 A |
| 4,024,936 A | * | 5/1977 | Crabb | F16D 55/38 192/221 |
| 4,140,198 A | * | 2/1979 | Chamberlain | B60K 17/046 180/370 |

(Continued)

FOREIGN PATENT DOCUMENTS

| | | |
|---|---|---|
| DE | 3638862 A1 | 6/1987 |
| DE | 4228815 A1 | 3/1993 |

OTHER PUBLICATIONS

German Search Report issued in counterpart application No. 102019212957.9 dated Apr. 1, 2020 (08 pages).

*Primary Examiner* — Michael R Mansen
*Assistant Examiner* — Mark K Buse
(74) *Attorney, Agent, or Firm* — Klintworth & Rozenblat IP LLP (57) ABSTRACT

A drive assembly includes a housing, upper and lower shafts, a friction pack, and a pair of meshed gears. The housing defines a receptacle containing a volume of lubricating fluid, a brake chamber with a metering orifice in a lower portion of the brake chamber, and an exit port at an upper portion of the brake chamber. The upper and lower shafts are within the housing at different elevations and configured for rotation. The friction pack is within the brake chamber and driven to rotate by the upper shaft. The pair of meshed gears is driven to rotate by one or more of the upper and lower shafts, and the gears communicate lubricating fluid from the receptacle to the lower portion of the brake chamber through the metering orifice. Rotation of the friction pack pumps lubricating fluid to the exit port at the upper portion of the brake chamber.

20 Claims, 9 Drawing Sheets

(56) References Cited

U.S. PATENT DOCUMENTS

| | | | | |
|---|---|---|---|---|
| 4,646,880 A * | 3/1987 | Logan | ............ | F16D 65/853 |
| | | | | 188/18 A |
| 4,655,326 A * | 4/1987 | Osenbaugh | ......... | F16D 65/853 |
| | | | | 188/18 A |
| 8,887,880 B2 * | 11/2014 | Cliff | ............ | F16D 65/853 |
| | | | | 188/264 D |
| 9,068,614 B2 * | 6/2015 | Andersson | ......... | F16D 55/36 |
| 9,382,997 B2 * | 7/2016 | McKinzie | ......... | F16H 57/0479 |
| 2004/0254044 A1 * | 12/2004 | Oberstarr | ......... | F16C 25/06 |
| | | | | 475/323 |
| 2009/0308709 A1 * | 12/2009 | Haupt | ............ | F16D 65/853 |
| | | | | 192/221 |
| 2011/0186390 A1 * | 8/2011 | Brenninger | ......... | F16D 65/853 |
| | | | | 188/71.5 |
| 2014/0141917 A1 * | 5/2014 | Demick | ............ | F16H 47/04 |
| | | | | 475/83 |

* cited by examiner

DRIVE ASSEMBLY WITH PASSIVE PUMP LUBRICATION

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure generally relates to work vehicles, and more specifically to lubricating driveline and other assemblies of work vehicles.

BACKGROUND OF THE DISCLOSURE

In the agriculture, construction, and forestry industries, as well as other industries, work vehicles include drive assemblies for driving various components of the machine, including various driveline components for driving wheels, tracks, or other propulsion members responsible for moving the work vehicles along the ground. It is important that such drive assemblies remain adequately lubricated to inhibit the adverse effects associated with wear of various types. Various active lubrication systems have dedicated pumps, valves and other components to control the distribution of lubricating fluids to wear and heat-generating areas of the machine. Certain passive lubrication techniques (e.g., splash lubrication) may be used in certain situations where the targed areas are in close proximity to the lubricating fluid source, thereby saving the cost and complexity associated with active lubrication systems.

SUMMARY OF THE DISCLOSURE

The present disclosure provides a drive assembly with passive pump lubrication in which lubricating fluid is pumped to components of the drive assembly without a dedicated pump.

In one aspect, a drive assembly is provided and includes a housing, upper and lower shafts, a friction pack, and a pair of meshed gears. The housing defines a receptacle containing a volume of lubricating fluid, a brake chamber with a metering orifice in a lower portion of the brake chamber, and an exit port at an upper portion of the brake chamber. The upper and lower shafts are within the housing at different elevations and configured for rotation. The friction pack is within the brake chamber and driven to rotate by the upper shaft. The pair of meshed gears is driven to rotate by one or more of the upper and lower shafts, and the gears communicate lubricating fluid from the receptacle to the lower portion of the brake chamber through the metering orifice. Rotation of the friction pack pumps lubricating fluid to the exit port at the upper portion of the brake chamber.

In another aspect, a drive assembly is provided and includes a housing, upper and lower shafts, a friction pack, and a pair of meshed gears. The housing defines a receptacle containing a volume of lubricating fluid and defines a brake chamber with a metering orifice in a lower portion of the brake chamber and an exit port at an upper portion of the brake chamber. The upper and lower shafts are within the housing at different elevations and configured for rotation. The friction pack is within the brake chamber and is driven to rotate by the upper shaft. The pair of meshed gears are driven to rotate by one or more of the upper and lower shafts. The gears communicate lubricating fluid from the receptacle to the lower portion of the brake chamber through the metering orifice. Rotation of the friction pack pumps lubricating fluid to the exit port, through the exit port, and into an axial passage defined through the upper shaft.

The details of one or more embodiments are set forth in the accompanying drawings and the description below. The components in the figures are not necessarily to scale, emphasis instead being placed upon illustrating the principles of the disclosure. Other features and advantages will become apparent from the description, the drawings, and the claims.

BRIEF DESCRIPTION OF THE DRAWINGS

Like reference symbols in the various drawings indicate like elements.

DETAILED DESCRIPTION

The following describes one or more example embodiments of the disclosed drive assembly with passive pump lubrication, as shown in the accompanying figures of the drawings described briefly above. Various modifications to the example embodiments may be contemplated by one of skill in the art.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

Furthermore, in detailing the disclosure, terms of direction and orientation, such as "forward," "front," "aft," "rear," "lateral," "horizontal," and "vertical" may be used. Such terms are defined, at least in part, with respect to the direction in which the work vehicle or implement travels during use. For example, the terms "forward" and "front"

(including "fore" and any further derivatives or variations) refer to a direction corresponding to the primary direction of travel, while the term "aft" and "rear" (and derivatives and variations) refer to an opposing direction. The term "longitudinal axis" may also reference an axis extending in fore and aft directions. By comparison, the term "lateral axis" may refer to an axis that is perpendicular to the longitudinal axis and extends in a horizontal plane; that is, a plane containing both the longitudinal and lateral axes. The term "vertical," as appearing herein, refers to an axis or a direction orthogonal to the horizontal plane containing the fore-aft and lateral axes. Further, the term "lubricating fluid" as used herein refers to any suitable liquid or semi-liquid (e.g., mixed with gases or flowable granular solids) used to lubricate and/or cool machine components (e.g., gears, shafts, etc.). Thus, it will be understood that the "lubricating fluid" may be used soley for lubrication or cooling, or for both lubrication and cooling.

Generally, a work vehicle includes various drive assemblies for driving various components of the machine and attached implements. For example, the propulsion driveline may include one or more drive assemblies (e.g., final drives) used to rotate wheels, sprockets, or other mechanisms to move the work vehicle along the ground or terrain. Drive assemblies typically have a variety of moving components, which require adequate lubrication to ensure the proper operation and lifespan for the drive assembly. Without proper lubrication and cooling, gears, shafts, friction packs, etc., of the drive assembly may experience excessive heat, wear and fatigue, thereby decreasing the expected life of the component(s) and potentially causing premature malfunction of the components and the overall drive assembly. It is particularly difficult to lubricate components of the drive assembly located at remote locations (e.g., higher elevations) or in confined spaces within the drive assembly. Conventional approaches may incorporate one or more pumps to actively control pumping of lubricating fluid as needed to lubricate the components such as these. Incorporation of such one or more pumps increases the cost, weight, and complexity of the overall assembly, and additionally provides extra components vulnerable to malfunction.

The disclosure provides pumping of lubricating fluid in a passive manner without additional pumps, valves, plumbing lines or passages, and control devices. The disclosure uses existing components of the assembly to deliver the lubricating fluid to targeted areas of the assembly. The lubricating fluid is not only delivered passively, but pumped passively (i.e., moved under force, such as by localized pressure differentials). The passive pumping may be established at one or multiple discrete pumping areas.

This disclosure may also passively pump lubricating fluid from a lower elevation region of the assembly to a higher elevation region of the assembly. In various implementations, the assembly and technique of this disclosure may deliver lubricating fluid from a lower reservoir or sump where the lubricating fluid is stored or collected within a housing of the assembly to rotating components at an upper region within the housing. For example, lubricating fluid by be carried by one or more components that communicate with (e.g., physically contact or are partially bathed in) the lubricating fluid in the sump to higher elevations within the housing. The lubricating fluid may then be carried or otherwise delivered (e.g., splashed) to one or more components that passively impart pumping action to the lubricating fluid. The pumping action thus forcefully distributes the lubricating fluid to one or more components at still higher elevations within the housing. Additionally or alternatively, the assembly may be configured to pump the lubricating fluid to remote locations within the housing to deliver lubricating fluid to components that are housed in distant and/or confined spaces within the housing. Thus, the passive pumping action may be directed in directions other than higher elevations, such as directions generally at equal or lower elevations.

Too much lubrication of components within the drive assembly may also create problems due to excessive frictional losses encountered by moving components (e.g., windage). Conventional systems may thus have avoided passive lubrication techniques for not affording a level of control commensurate with the active lubrication systems. This assembly and technique of this disclosure addresses this concern by providing passive metering control of the lubricating fluid. In various implementations, the lubricating fluid is passed through one or more metering orifices of one or more controlled dimensions prior to reaching the targeted components. In this way, lubricating fluid may flow to the targeted components at a controlled flow rate and/or volume. When the components are housed in a dedicated compartment or other confined spaced, the metering opening(s) may be sized and located to control the pooling or collection of the lubricating fluid so that a sufficient reserve is available to the targeted components while limiting the volume of collected lubricating fluid to a level less than would result in execessive frictional losses (e.g., windage) and related operational inefficiencies.

The following discussion of one or more example implementations of the assembly and method disclosed herein may sometimes focus on the example application of a drive assembly configured to drive a track to propel a crawler dozer along the terrain. In other examples, the drive assembly may have a different configuration and be incorporated into other applications. In some embodiments, for example, the drive assembly may be used with other types of work vehicles in the agriculture, construction, forestry or other off-road industries. Moreover, while the various example implementations described herein pertain to a drive assembly in the context of propulsion of the work vehicle, it should be understood that the disclosed assembly and method may also be applied to stationary drive assemblies or drive assemblies in work vehicles that are used to drive components for purposes other than propulsion (e.g., various work implements and so on).

The following describes one or more example implementations of the disclosed drive assembly utilized in a work vehicle, as shown in the accompanying figures of the drawings described briefly above. Generally, the disclosed drive assemblies (and work vehicles in which they are implemented) provide for improved lubrication of the drive assemblies as compared to conventional systems and arrangements.

Figure 1:
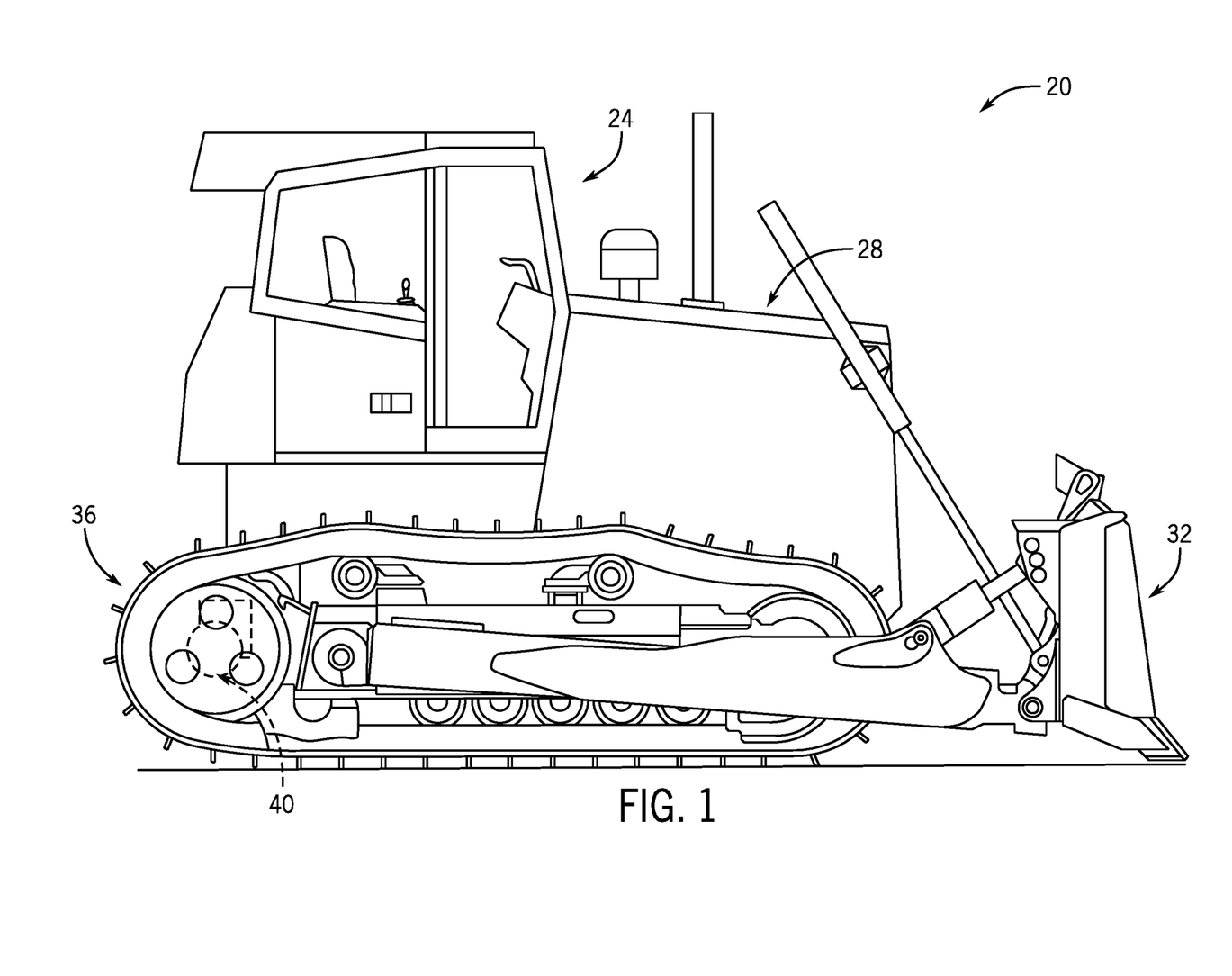
FIG. 1 is an elevational view of one example of a work vehicle including one example of a drive assembly.

Referring now to FIG. 1, one example of a work vehicle 20 is illustrated in the form of a crawler dozer having a work implement 32 in the form of a blade. The work vehicle 20 includes a cab 24, an engine compartment 28, a work implement 32, and propulsion members 36. The cab 24 is capable of having many configurations and is the location of the work vehicle 20 occupied by an operator. The cab 24 may include, for example, controls, displays, actuators, etc., manipulatable by the operator to control operation of the work vehicle 20. The engine compartment 28 is capable of having many configurations and generally contains a drive member such as, for example, a motor or engine for providing the necessary power to various components of the work vehicle 20. In one example, the engine may be a diesel powered internal combustion engine. Other components associated with the engine may also be housed or contained, at least in part, in the engine compartment 28.

The work vehicle 20 may have various propulsion members for moving the work vehicle 20 along a terrain. The type of propulsion member(s) used with a work vehicle may depend on the type of terrain and/or the type of work being performed by the work vehicle 20. In the illustrated example, the propulsion members are endless tracks 36 with one endless track 36 on each of the right and left sides of the work vehicle 20. In other examples, the propulsion members may be other types of propulsion members including, but not limited to ground-engaging wheels. The example work vehicle 20 includes drive assemblies 40 in the form of final drives coupled to each track 36 via sprockets 41. The drive assemblies 40 are configured to drive the tracks 36 and provide braking capability to the tracks 36. In one example, the braking capability includes a park brake assembly 72 (see FIG. 4).

Figure 2:
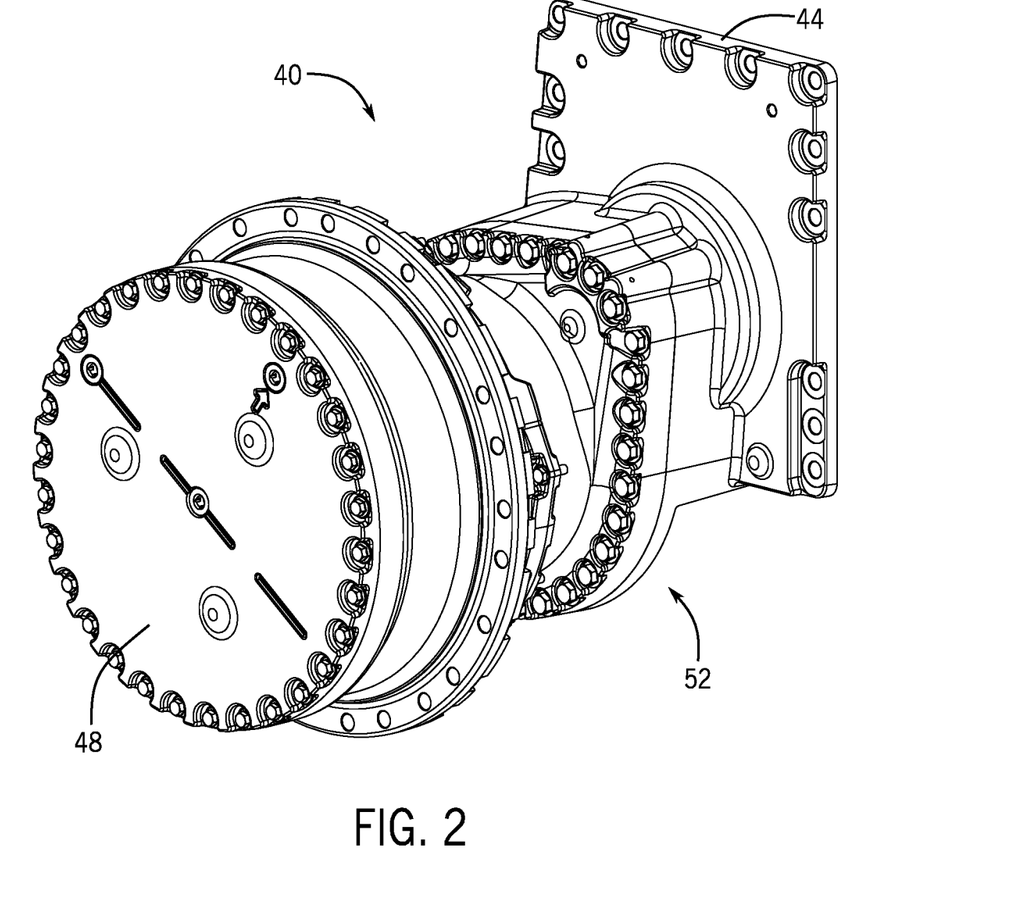
FIG. 2 is a perspective view of the drive assembly in FIG. 1.
Figure 3:
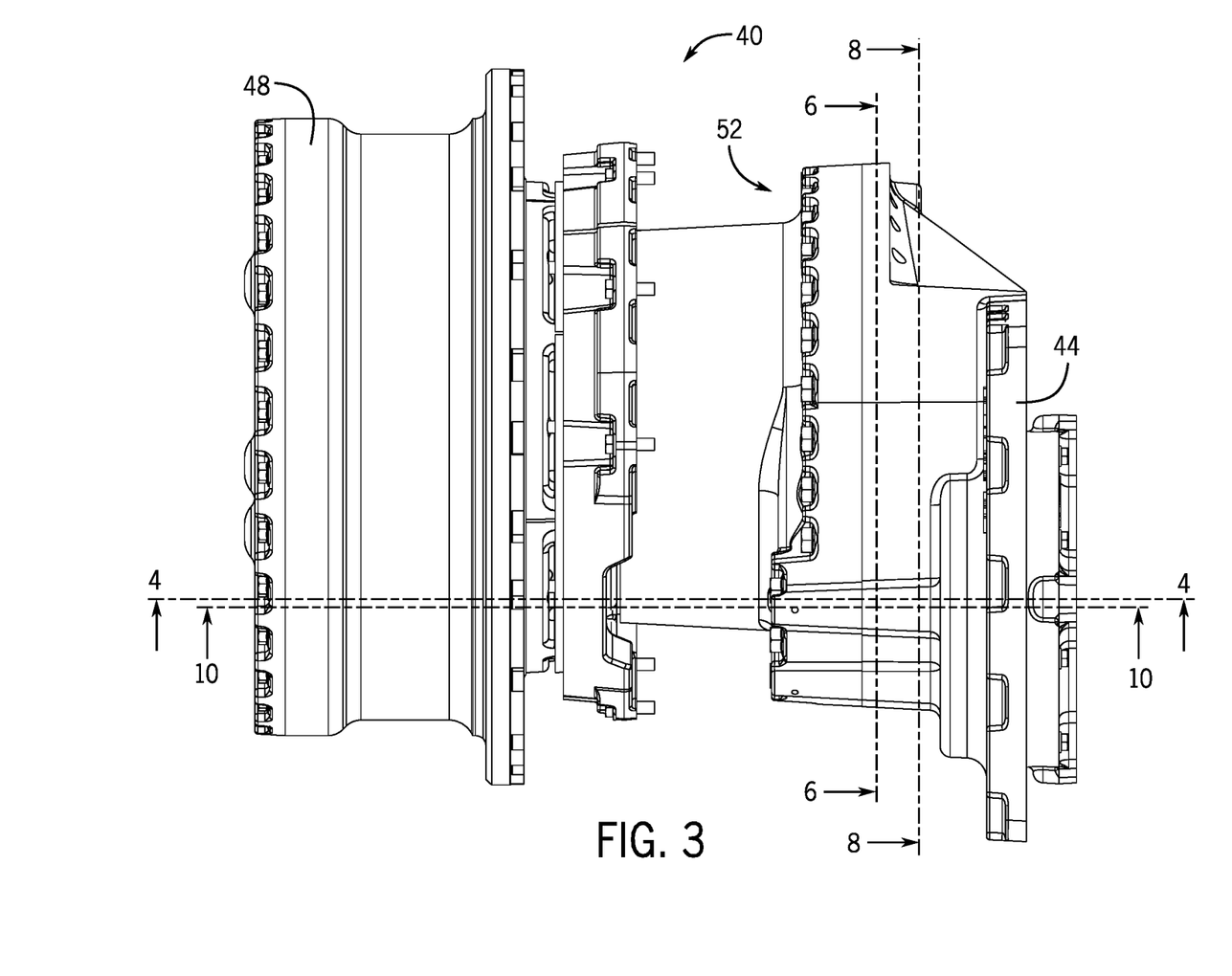
FIG. 3 is a top plan view of the drive assembly in FIG. 2.
Figure 5:
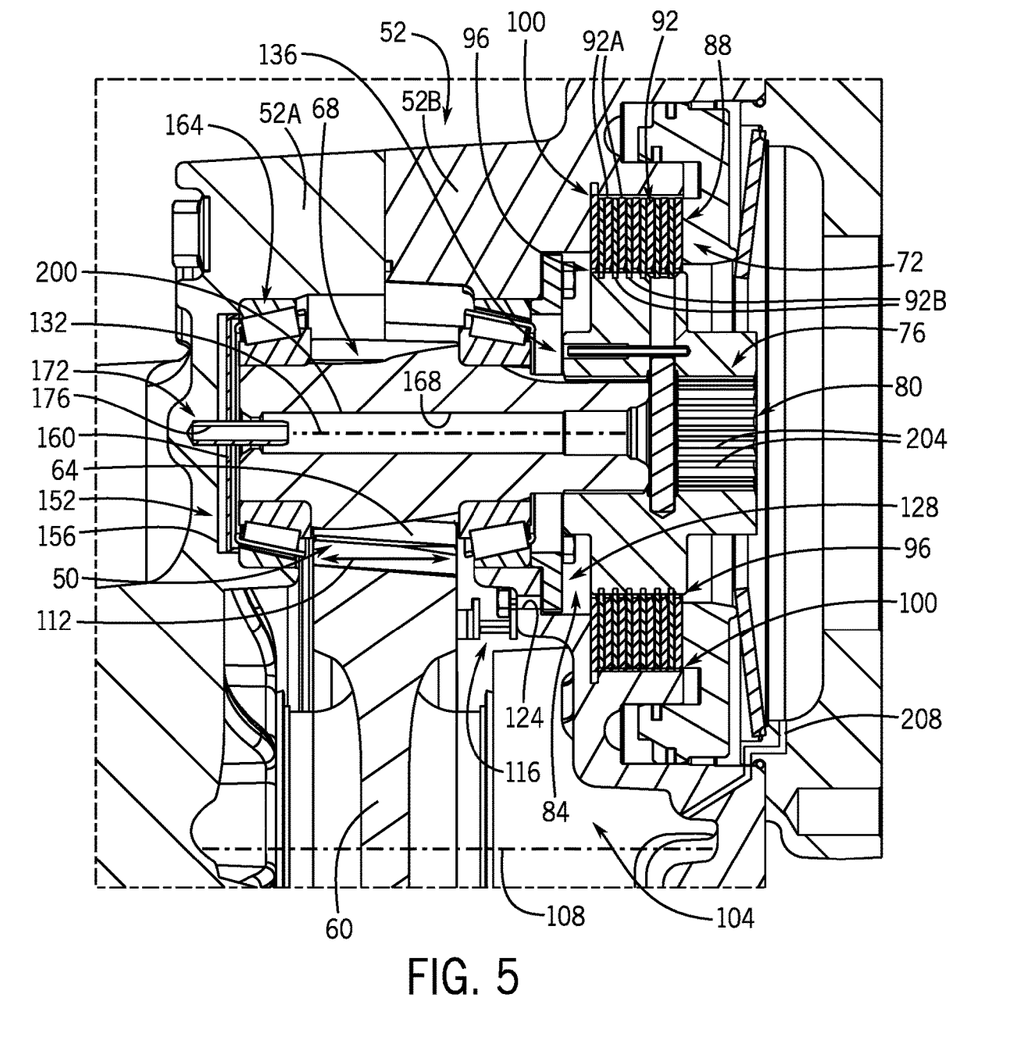
FIG. 5 is an enlarged view of a area 5-5 of the cross-sectional view of FIG. 4.

Referring also to FIGS. 2 and 3, one example of a drive assembly 40 is illustrated. While the work vehicle 20 includes multiple drive assemblies 40, only one drive assembly 40 will be described herein with it being understood that the structure and functionality of the drive assembly 40 may apply to the other drive assemblies of the work vehicle 20. In one example, the drive assembly 40 may include a mounting plate 44 to couple the drive assembly 40 to the work vehicle 20, a rotatable drive member 48 coupled to the track 36, and a housing 52 between the mounting plate 44 and the drive member 48. The housing 52 may be a unitary component or formed in one or more parts (such as housing parts 52A and 52B as shown in FIG. 5), however, for simplicity it will be referred to below as housing 52. The drive member 48 may have a wide variety of configurations to cooperate with a desired type of propulsion member. In one example, the drive member 48 is a cylindrical drum configured to mount a sprocket 41 for co-rotation that has teeth that are received within the open spaces of the links of the tracks 36.

Figure 4:
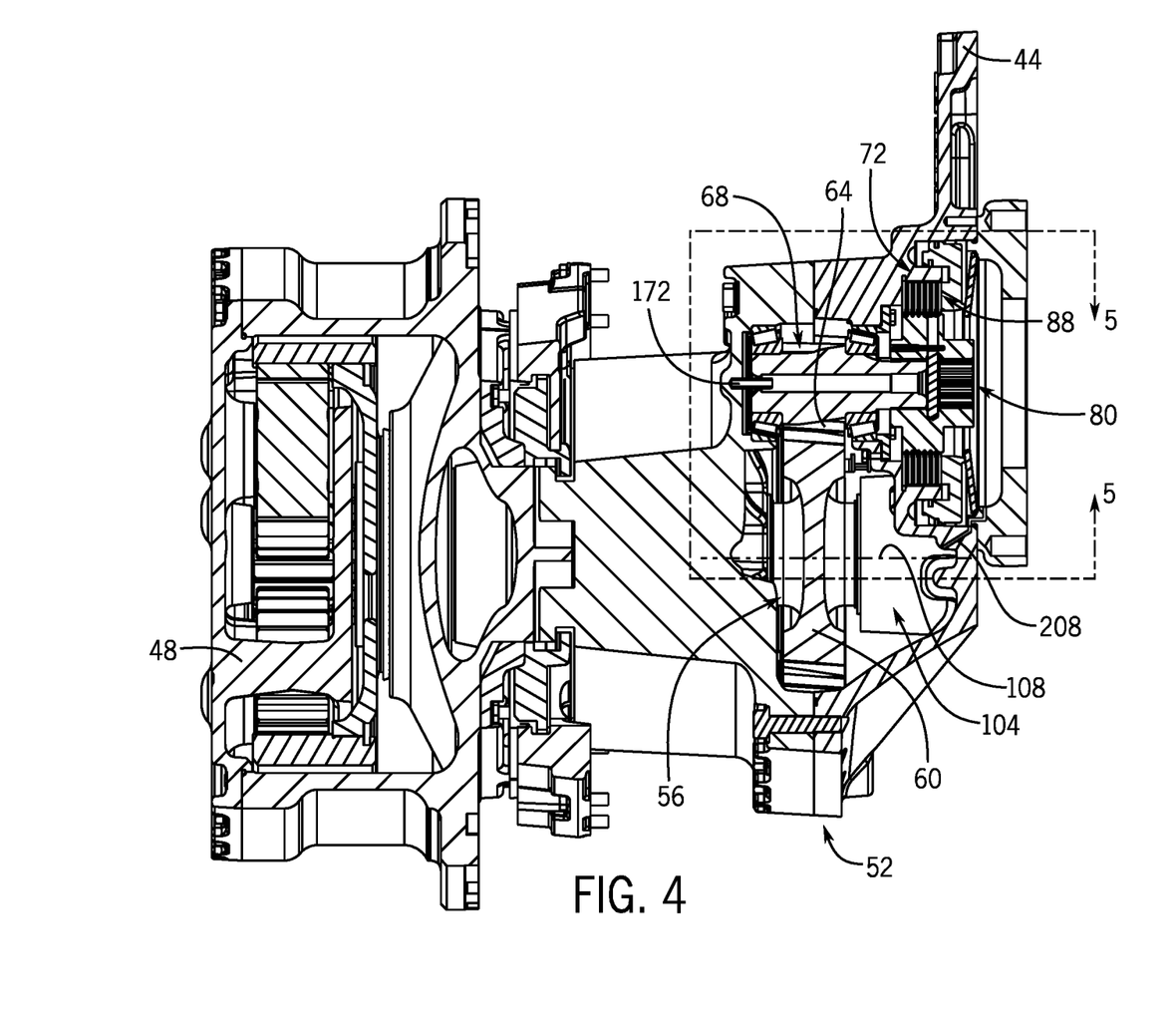
FIG. 4 is a side cross-sectional view taken along line 4-4 in FIG. 3.
Figure 6:
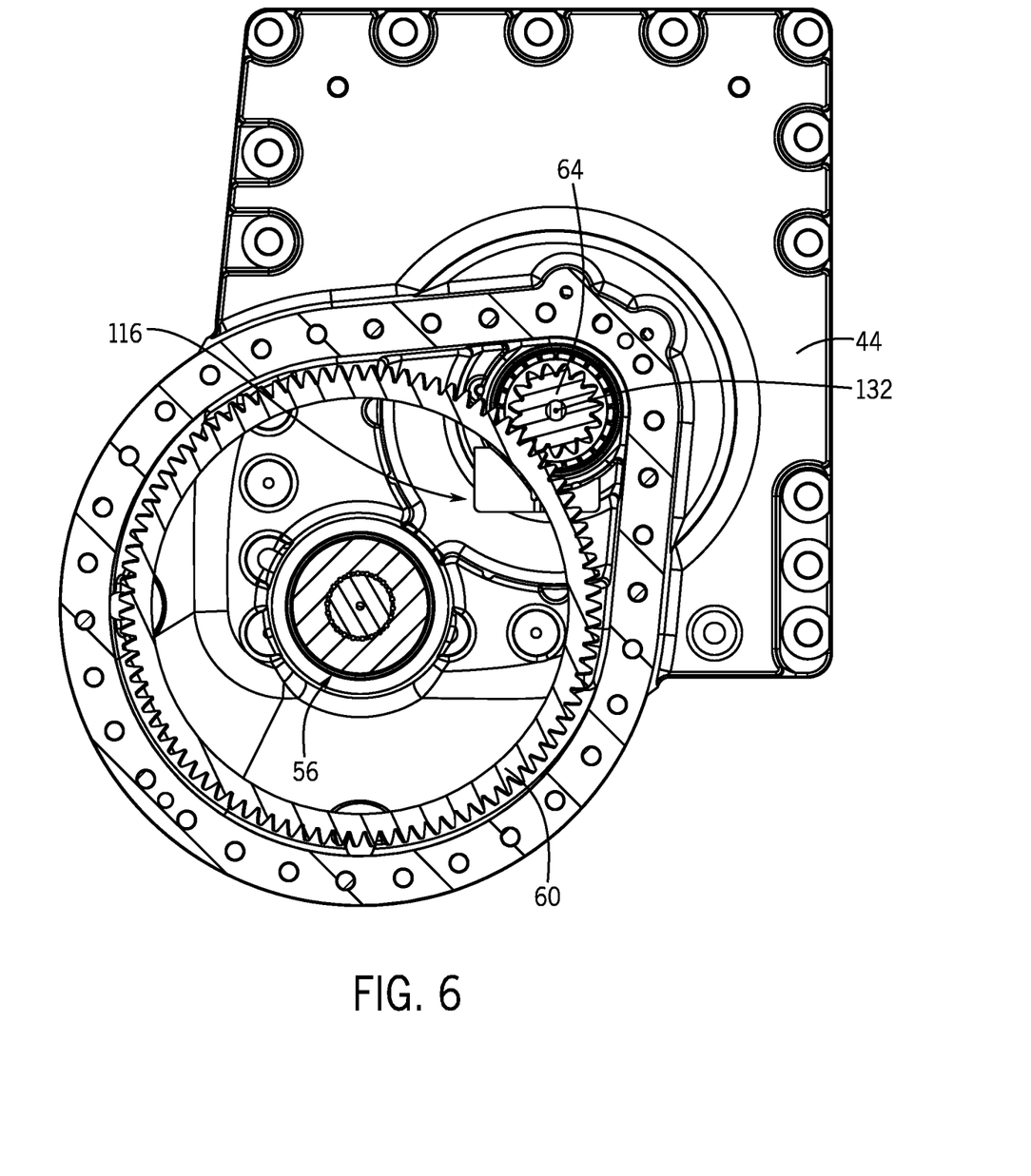
FIG. 6 is an end cross-sectional view taken along line 6-6 in FIG. 3.

Referring also to FIGS. 4-6, the drive assembly 40 may include a first or lower shaft 56 rigidly coupled to and rotatable with the drive member 48, a first gear or bull gear 60 rigidly coupled to and rotatable with the first shaft 56, a second gear 64 meshing with the first gear 60, and a second or upper shaft 68 rigidly coupled to and rotatable with the second gear 64. In one example, the upper shaft 68 is disposed in the drive assembly 40 at a higher elevation than the lower shaft 56. Rotating components of a brake assembly 72 may be coupled to the second shaft 68 and an end 76 of the second shaft 68 may be splined so as to couple to an output (e.g., drive shaft) of the engine of the work vehicle 20. In one example, the engine of the work vehicle 20 drives or rotates the second shaft 68 via the splined connection 80, which rotates the second gear 64. The second gear 64 rotates the first gear 60 at a gear mesh 50 and the first gear 60 rotates the first shaft 56, which in turn rotates the drive member 48. Rotation of the drive member 48 causes the track or other propulsion member 36 to rotate or move, thereby moving the work vehicle 20 along the terrain.

The drive assembly 40 defines a brake chamber 84, and the brake assembly 72 is at least partially positioned in the brake chamber 84. In one example, the brake assembly 72 is a wet friction plate park brake and may include a friction pack 88 comprised of a plurality of friction disks or plates 92. Each of the plurality of friction plates 92 may be generally circular in shape, may define an opening through a center thereof, and may include an inner diameter 96 and an outer diameter 100. In one example, a first set of friction plates (or separator plates) 92A may be rigidly coupled to an interior of the brake chamber 84 at their outer diameters 100 and held stationary, while a second set of friction plates (or friction disks) 92B may be connected to the second shaft 68 at their inner diameters 96 and rotate with the second shaft 68 relative to the first set of friction plates 92A. In some examples, the first set and second set of friction plates 92A, 92B alternate with each other in the friction pack 88. A plurality of features such as grooves or recesses are defined in either or both of the first and second sets of friction plates 92A, 92B to allow lubricating liquid or fluid to pass between the sets of friction plates 92A, 92B. In some examples, to actuate the brake assembly 72, pressure is applied to the brake assembly 72 to cause the first and second sets of friction plates 92A, 92B to compress together, thereby providing resistance to rotation of the rotating set of friction plates 92B, which resists rotation of the second shaft 68 and interconnected components as described above.

Figure 7:
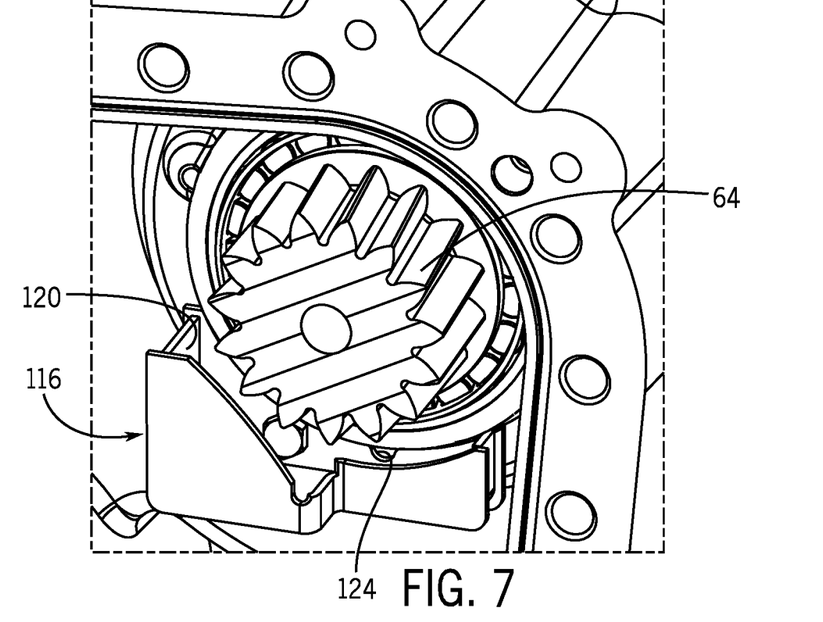
FIG. 7 is a partial perspective view of one example of a portion of the drive assembly shown in FIG. 2.
Figure 8:
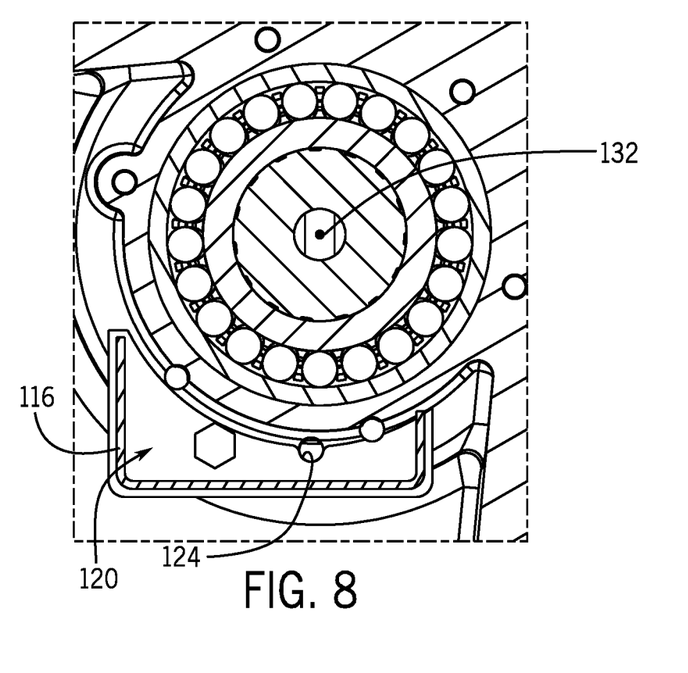
FIG. 8 is a partial cross-sectional view taken along line 8-8 in FIG. 3.

Referring also to FIGS. 7 and 8, in one example, the housing 52 of the drive assembly 40 may define a lubricant receptacle or sump 104 configured to retain a supply of lubricating fluid 108. In one example, the first gear 60 is partially submerged in the lubricating fluid 108 present in the sump 104. As the first gear 60 rotates, the first gear 60 carries lubricating fluid thereon up and out of the supply of lubricant toward the second gear 64. At the gear mesh 50 of the first and second gears 60, 64, the lubricating fluid 108 is forced, flung, splashed or otherwise dispersed away from the gear mesh 50 (represented by arrows 112 in FIG. 5). As viewed in FIG. 5, lubricating fluid 108 is dispersed in multiple directions out of the gear mesh 50 between the first and second gears 60, 64. In one example, at least some of the lubricating fluid moving to the right, as viewed in FIG. 5, out of the gear mesh 50 is captured by a catch basin 116. In one example, the catch basin 116 may be coupled to the housing 52 and may define a basin receptacle 120 configured to hold a quantity of lubricating fluid. In one example, a metering orifice 124 is defined through the housing 52 and is in fluid communication with the catch basin 116 and the brake chamber 84. In one example, the metering orifice 124 is in fluid communication with a lower portion 128 of the brake chamber 84 and is configured to communicate lubricating fluid to the inner diameters 96 of the friction plates 92. In one example, a longitudinal rotation axis 132 extends through a center of the second shaft 68 and may be used to define the lower portion 128 of the brake chamber 84, which is the portion of the brake chamber 84 below the longitudinal rotation axis 132, and an upper portion 136 of the brake chamber 84, which is the portion of the brake chamber 84 above the longitudinal rotation axis 132. In other examples, upper and lower portions of the brake chamber 84 may be defined in other manners and all of such possibilities are intended to be within the spirit and scope of the present disclosure.

With continued reference to FIGS. 4-8, in one example, the metering orifice 124 is sized and shaped to meter or allow a desired and appropriate amount of lubricating fluid to pass from the catch basin 116 to the lower portion 128 of the brake chamber 84 and to the inner diameters 96 of the friction plates 92. The metering orifice 124 may be any size and shape depending on the lubrication demands of the brake assembly 72. Insufficient quantities of lubricating fluid in the drive assembly 40 may allow excessive friction on the components of the drive assembly and decrease the life of the components. Moreover, excessive lubricating fluid in the drive assembly 40 may create excessive windage on the components of the drive assembly 40. In one example, the metering orifice 124 may be between about one-eighth of an inch and about three-quarters of an inch at its maximum width or maximum diameter. In another example, the metering orifice 124 may be between about one-quarter of an inch and about three-quarters of an inch at its maximum width or maximum diameter. In a further example, the metering orifice 124 may be about one-half of an inch at its maximum width or maximum diameter.

Figure 9:
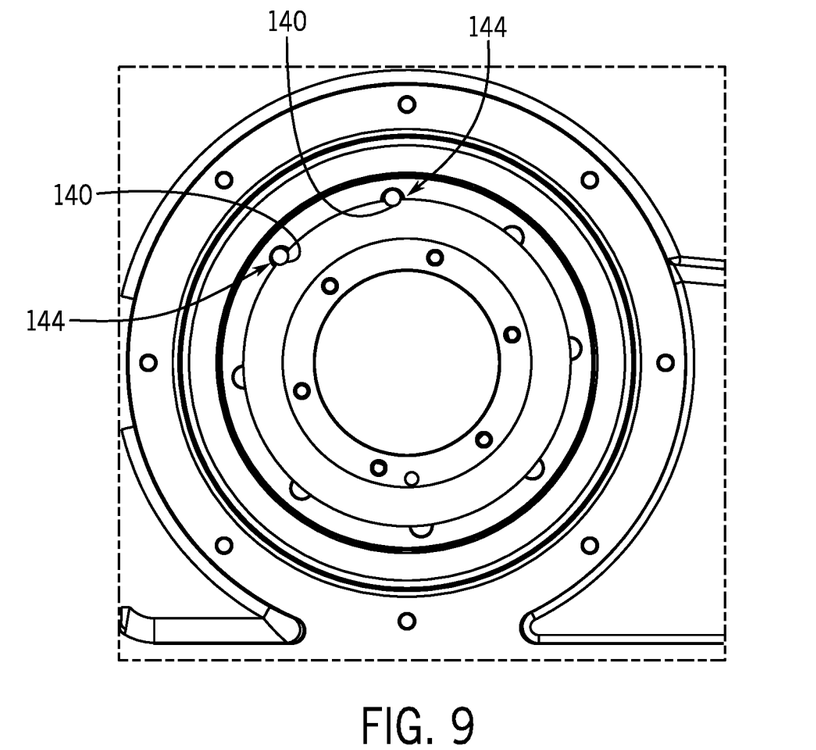
FIG. 9 is a side elevational view of a portion of the drive assembly shown in FIG. 2 with a portion of the drive assembly removed.
Figure 10:
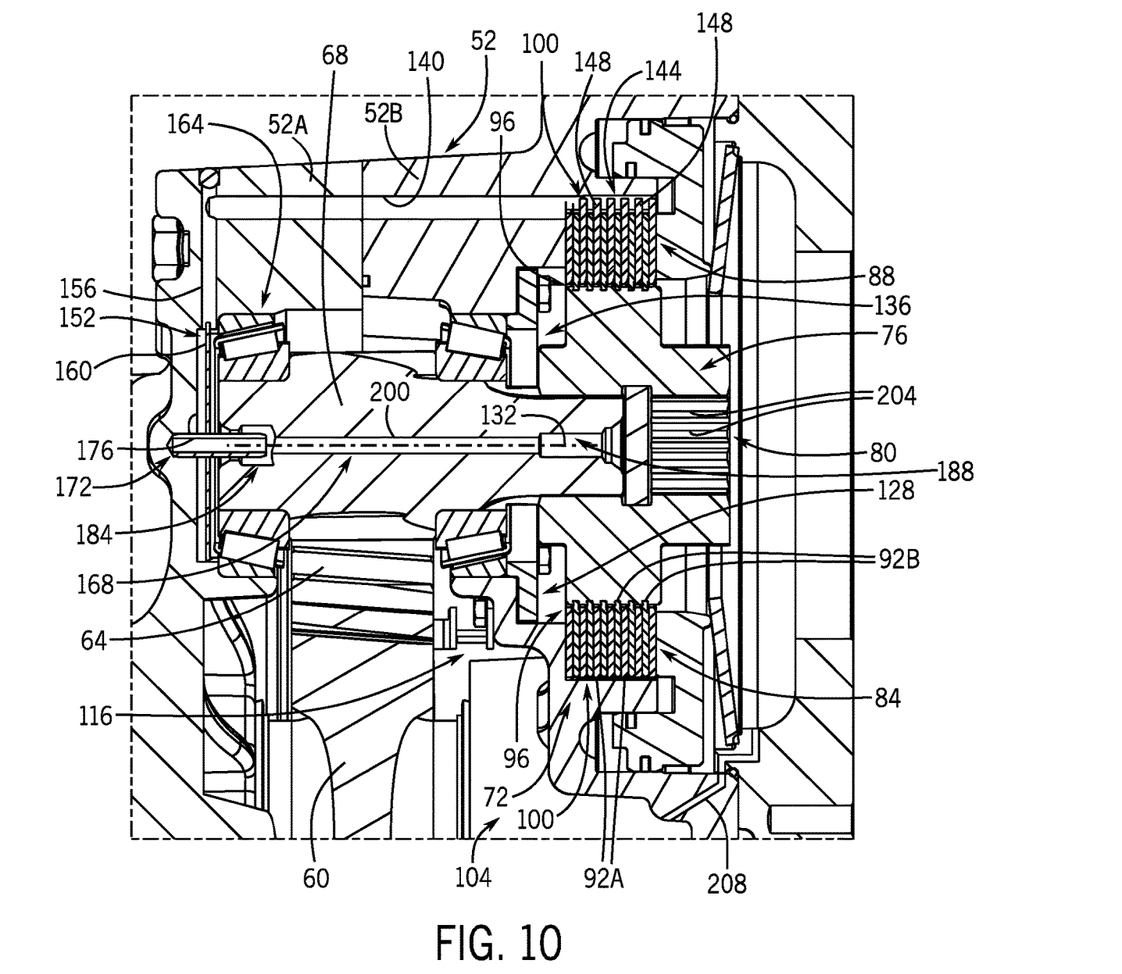
FIG. 10 is a another side cross-sectional view taken along line 10-10 in FIG. 3.

With particular reference to FIGS. 5, 9 and 10, in one example, rotation of the second shaft 68 and second set of friction plates 92B may pump, force, or otherwise move the lubricating fluid from the inner diameters 96 of the friction plates 92, due to centrifugal force caused by rotation of the second set of friction plates 92B and friction interacting with the lubricating fluid, to the outer diameters 100 of the friction plates 92. In one example, a pair of exit ports 140 may be defined in the housing 52 of the brake assembly 72 in the upper portion 136 of the brake chamber 84 and may be aligned with or positioned proximate to the outer diameters 100 of the friction plates 92. In other examples, any number of exit ports 140 may be defined in the housing 52, including one and more than two. In further examples, one or more exit ports 140 may be defined in both the upper portion 136 and the lower portion 128 of the brake chamber 84. In still other examples, one or more exit ports 140 may be defined in only the lower portion 128 of the brake chamber 84. Returning to the illustrated example, one end 144 of each of the exit ports 140 may receive lubricating fluid from the outer diameters 100 of the friction plates 92. In one example, the friction plates 92A in the friction pack 88 may include one or more anti-rotation projections, splines or tabs 148, which may also be used to route the lubricating fluid into the exit ports 140. The lubricating fluid may move through the exit ports 140 away from the friction plates 92 and down into a lubricating fluid reservoir 152. In one example, the lubricating fluid reservoir 152 is defined between a wall or surface 156 of the housing 52 of the drive assembly 40 and a cap 160 coupled to an end of the second shaft 68 and a bearing assembly 164 that facilitates, at least in part, rotation of the second shaft 68 relative to the housing 52.

Figure 11:
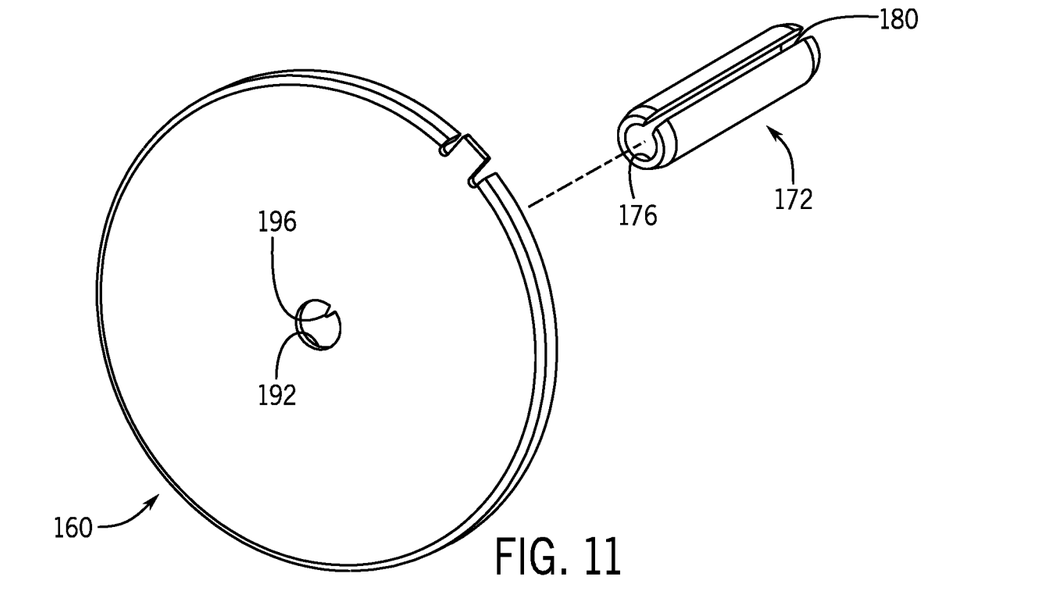
FIG. 11 is a perspective view of one example pin and cap arrangement of the drive assembly in FIG. 2.

Referring now to FIGS. 10 and 11, in one example, the second or upper shaft 68 may define an axial passage 168 therethrough. In one example, a pin 172 may be axially aligned with and at least partially positioned in the axial passage 168. The pin 172 may be hollow and may define a pin cavity 176 therein. In one example, an opening or slit 180 may be defined along a length of the pin 172 and is in communication with the pin cavity 176. In one example, axial passage 168 may include a first portion 184 having a first diameter and a second portion 188 having a second diameter with the first portion 184 having a larger diameter than the second portion 188. In such an example, the pin 172 is positioned in the first portion 184 of the axial passage 168 such that the second shaft 68 is configured to rotate relative to the pin 172 without engagement or interference with the pin 172. In this example, the pin cavity 176 may have a smaller diameter than the second portion 188 of the axial passage 168. With the pin 172 positioned in one end of the second shaft 68, the slit 180 in the pin 172 is positioned in an upper half of the pin 172. In one example, the cap 160 may include a central opening 192 configured to receive the pin 172 therein and retain the pin 172 in a fixed orientation. In one example, the cap 160 includes a projection or key 196 defined in the central opening 192 of the cap 160 that is positioned in the slit 180 of the pin 172 to retain the pin 172 in a fixed orientation relative to the cap 160 and the second shaft 68. In this configuration, the second shaft 68 is configured to rotate relative to the cap 160 and the pin 172.

Lubricating fluid builds up in the lubricating fluid reservoir 152 and flows, moves, is pumped or otherwise passes through the slit 180 in the pin 172 from the lubricating fluid reservoir 152 and into the pin cavity 176. The lubricating fluid reservoir 152 may be any size and shape to hold a desired and/or appropriate quantity of lubricating fluid. From the pin cavity 176, the lubricating fluid flows, moves, is pumped or otherwise passes into the axial passage 168. Rotation of the second shaft 68 places the lubricating fluid under centrifugal force, which flings the lubricating fluid against a wall 200 of the axial passage 168. As lubricating fluid accumulates in the axial passage 168, the lubricating fluid wants to flow out of the axial passage 168. Since the pin 172 is positioned in one end of the axial passage 168 and has a reduced diameter, thereby resisting or inhibiting flow in the direction of the pin 172, the lubricating fluid flows in an opposite direction toward a second end of the axial passage 168. At the second end of the axial passage 168, the lubricating fluid may lubricate splines 204 defined in the second shaft 68 where an engine output of the work vehicle may couple to the second shaft 68. Without proper lubrication between the second shaft 68 and the engine output, fretting can occur between the second shaft 68 and the engine output. Lubricating fluid passing through the axial passage 168 toward the splines 204 may provide an adequate amount of lubrication to inhibit fretting between the second shaft 68 and the engine output.

Referring also to FIG. 10, in one example, a drainage port 208 may be defined in the housing 52 of the drive assembly 40, may be in communication with the sump 104, and may allow lubricating fluid to return to the sump 104 after the lubricating fluid exits the axial passage 168 of the second shaft 68. The lubricating fluid exits the second shaft 68, falls under gravity to a lower elevation than the second shaft 68, enters the drainage port 208, exits the drainage port 208, and falls under gravity into the sump 104 where a supply of lubricating fluid 108 is stored. In one example, the drainage port 208 is defined in the housing 52 at a lower elevation than the metering orifice 124. In some examples, a plurality of drainage ports 208 may be defined in the housing 52 of the drive assembly 40. The one or more drainage ports of the present disclosure may be configured and defined in the drive assembly 40 in any manner to allow lubricating fluid to return to the sump 104 and all of such possibilities are intended to be within the spirit and scope of the present disclosure.

The drive assemblies 40 of the present disclosure are capable of passively pumping lubricating fluid therein without the use of a separate pump and the associated valving, pluming lines and control devices. That is, the components of the drive assemblies 40 and operation of such components provides the pumping action required to pump the lubricating fluid through the drive assembly 40 to the target components. In the illustrated example, operation of the brake assembly 72 imparts the necessary forces (e.g., centrifugal and frictional forces) to the lubricating fluid to pump the lubricating fluid from the lower portion 128 of the brake chamber 84 and to the inner diameters 96 of the friction plates 92 radialy outward from the longitudinal rotation axis 132, and passively pump the lubricating fluid upward against gravity to a higher elevation within the housing 52 where it can be routed to the second shaft 68 by gravity.. Furthermore, a second pumping action is provided in the illustrated example to passively pump the lubricating fluid through the axial passage 168 in the second shaft 68. The reduced diameter at the connection of the pin 172 not only inhibits flow of the lubricating flulid toward the pin 172, but also, as the second shaft 68 is rotated, the centrifugal force acting on the lubricating fluid effects a passive pumping action that pumps the lubricant fluid to the second end of the axial passage 168 to lubricate the splines 204 due to a pressure delta effected by the relatively smaller opening area at the pin 172 compared to the opposite end of the second shaft 68.

Also, the following examples are provided, which are numbered for convenient reference, as follows:

1. A drive assembly comprising: a housing defining a receptacle containing a volume of lubricating fluid and defining a brake chamber with a metering orifice in a lower portion of the brake chamber and an exit port at an upper portion of the brake chamber; upper and lower shafts within the housing at different elevations and configured for rotation; a friction pack within the brake chamber and driven to rotate by the upper shaft; and a pair of meshed gears driven to rotate by one or more of the upper and lower shafts, the gears communicating lubricating fluid from the receptacle to the lower portion of the brake chamber through the metering orifice; wherein rotation of the friction pack pumps lubricating fluid to the exit port at the upper portion of the brake chamber.

2. The drive assembly of example 1, wherein the housing defines a catch basin beneath the metering orifice for collecting lubricating fluid splashed from the meshed gears, the collected lubricating fluid being in communication with the metering orifice.

3. The drive assembly of example 1, wherein the upper shaft has a rotation axis extending longitudinally through a center thereof; and wherein the exit port of the brake chamber is above the rotation axis.

4. The drive assembly of example 3, wherein the exit port is one of a plurality of exit ports at the upper portion of the brake chamber.

5. The drive assembly of example 1, wherein the lubricating fluid flows from the brake chamber into the exit port and flows out of the exit port and into an axial passage through the upper shaft.

6. The drive assembly of example 5, wherein rotation of the upper shaft pumps the lubricating fluid through and out of the axial passage.

7. The drive assembly of example 5, further comprising a drainage port at a lower elevation than the metering orifice and in communication with the receptacle, wherein the drainage port allows lubricating fluid that has exited the axial passage of the upper shaft to drain into the receptacle.

8. The drive assembly of example 5, further comprising a lubricating fluid reservoir between the exit port and the axial passage, wherein the lubricating fluid reservoir contains a volume of lubricating fluid that has exited the exit port and prior to flowing into the axial passage.

9. The drive assembly of example 8, further comprising a pin axially aligned with the axial passage and defining an opening therein in communication with the lubricating fluid reservoir and the axial passage, wherein lubricating fluid in the reservoir passes through the opening in the pin to flow into the axial passage.

10. A drive assembly comprising: a housing defining a receptacle containing a volume of lubricating fluid and defining a brake chamber with a metering orifice in a lower portion of the brake chamber and an exit port at an upper portion of the brake chamber; upper and lower shafts within the housing at different elevations and configured for rotation; a friction pack within the brake chamber and driven to rotate by the upper shaft; and a pair of meshed gears driven to rotate by one or more of the upper and lower shafts, the gears communicating lubricating fluid from the receptacle to the lower portion of the brake chamber through the metering orifice; wherein rotation of the friction pack pumps lubricating fluid to the exit port, through the exit port, and into an axial passage defined through the upper shaft.

11. The drive assembly of example 10, wherein the housing defines a catch basin beneath the metering orifice for collecting lubricating fluid splashed from the meshed gears, the collected lubricating fluid being in communication with the metering orifice.

12. The drive assembly of example 10, wherein the friction pack has an inner diameter and an outer diameter, and wherein the metering orifice meters lubricating fluid to the inner diameter of the friction pack.

13. The drive assembly of example 12, wherein the exit port is one of a plurality of exit ports proximate the outer diameter of the friction pack.

14. The drive assembly of example 10, wherein rotation of the upper shaft pumps the lubricating fluid through and out of the axial passage.

15. The drive assembly of example 10, further comprising a lubricating fluid reservoir between the exit port and the axial passage, wherein the lubricating fluid reservoir contains a volume of lubricating fluid that has exited the exit port and prior to flowing into the axial passage.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments and examples herein were chosen and described to best explain the principles of the disclosure and their practical application, and to enable others of ordinary skill in the art to understand the disclosure and recognize many alternatives, modifications, and variations on the described embodiments and examples. Accordingly, various embodiments and implementations other than those explicitly described are within the scope of the following claims.

What is claimed is:

1. A drive assembly comprising:
a housing defining a receptacle containing a volume of lubricating fluid and defining a brake chamber with a metering orifice in a lower portion of the brake chamber and an exit port at an upper portion of the brake chamber;
upper and lower shafts within the housing at different elevations and configured for rotation;
a friction pack within the brake chamber and driven to rotate by the upper shaft; and
a pair of meshed gears driven to rotate by one or more of the upper and lower shafts, the gears communicating lubricating fluid from the receptacle to the lower portion of the brake chamber through the metering orifice;

wherein rotation of the friction pack pumps lubricating fluid to the exit port at the upper portion of the brake chamber.

2. The drive assembly of claim 1, wherein the friction pack includes projections that direct the lubricating fluid away from the friction pack to the exit port of the brake chamber.

3. The drive assembly of claim 1, wherein the housing defines a catch basin beneath the metering orifice for collecting lubricating fluid splashed from the meshed gears, the collected lubricating fluid being in communication with the metering orifice.

4. The drive assembly of claim 1, wherein the friction pack is a park brake assembly.

5. The drive assembly of claim 4, wherein the park brake assembly has an inner diameter and an outer diameter, and wherein the metering orifice meters lubricating fluid to the inner diameter of the park brake assembly.

6. The drive assembly of claim 1, wherein the upper shaft has a rotation axis extending longitudinally through a center thereof; and wherein the exit port of the brake chamber is above the rotation axis.

7. The drive assembly of claim 6, wherein the exit port is one of a plurality of exit ports at the upper portion of the brake chamber.

8. The drive assembly of claim 1, wherein the lubricating fluid flows from the brake chamber into the exit port and flows out of the exit port and into an axial passage through the upper shaft.

9. The drive assembly of claim 8, wherein rotation of the upper shaft pumps the lubricating fluid through and out of the axial passage.

10. The drive assembly of claim 8, further comprising a drainage port at a lower elevation than the metering orifice and in communication with the receptacle, wherein the drainage port allows lubricating fluid that has exited the axial passage of the upper shaft to drain into the receptacle.

11. The drive assembly of claim 8, further comprising a lubricating fluid reservoir between the exit port and the axial passage, wherein the lubricating fluid reservoir contains a volume of lubricating fluid that has exited the exit port and prior to flowing into the axial passage.

12. The drive assembly of claim 11, further comprising a pin axially aligned with the axial passage and defining an opening therein in communication with the lubricating fluid reservoir and the axial passage, wherein lubricating fluid in the reservoir passes through the opening in the pin to flow into the axial passage.

13. A drive assembly comprising:

a housing defining a receptacle containing a volume of lubricating fluid and defining a brake chamber with a metering orifice in a lower portion of the brake chamber and an exit port at an upper portion of the brake chamber;

upper and lower shafts within the housing at different elevations and configured for rotation;

a friction pack within the brake chamber and driven to rotate by the upper shaft; and a pair of meshed gears driven to rotate by one or more of the upper and lower shafts, the gears communicating lubricating fluid from the receptacle to the lower portion of the brake chamber through the metering orifice;

wherein rotation of the friction pack pumps lubricating fluid to the exit port, through the exit port, and into an axial passage defined through the upper shaft.

14. The drive assembly of claim 13, wherein the housing defines a catch basin beneath the metering orifice for collecting lubricating fluid splashed from the meshed gears, the collected lubricating fluid being in communication with the metering orifice.

15. The drive assembly of claim 13, wherein the friction pack has an inner diameter and an outer diameter, and wherein the metering orifice meters lubricating fluid to the inner diameter of the friction pack.

16. The drive assembly of claim 15, wherein the exit port is one of a plurality of exit ports proximate the outer diameter of the friction pack.

17. The drive assembly of claim 13, wherein rotation of the upper shaft pumps the lubricating fluid through and out of the axial passage.

18. The drive assembly of claim 17, further comprising a drainage port in communication with the receptacle, wherein the drainage port allows lubricating fluid that has exited the axial passage to drain into the receptacle.

19. The drive assembly of claim 13, further comprising a lubricating fluid reservoir between the exit port and the axial passage, wherein the lubricating fluid reservoir contains a volume of lubricating fluid that has exited the exit port and prior to flowing into the axial passage.

20. The drive assembly of claim 19, further comprising a pin axially aligned with the axial passage and defining an opening therein in communication with the lubricating fluid reservoir and the axial passage, wherein lubricating fluid in the reservoir passes through the opening in the pin to flow into the axial passage.

* * * * *